Patented July 4, 1933

1,916,338

UNITED STATES PATENT OFFICE

CHARLES F. SHERWOOD, OF HIGHLAND PARK, MICHIGAN, ASSIGNOR TO SHERWOOD PATENTS, LTD., OF SAN FRANCISCO, CALIFORNIA, A CORPORATION OF CALIFORNIA

BEARING

No Drawing.   Application filed November 13, 1929.   Serial No. 407,020.

One of the primary objects of my invention is to produce a hard, strong, porous metal structure which is particularly adaptable for use as a bearing metal.

A more specific object of my invention is to produce such a structure composed of a plurality of metals, one particular combination of which is copper and tin.

Another object of my invention is to produce such a structure by sintering the powdered metal from which it is formed in a reducing bath—as for instance, in a cyanide bath.

While various metals and combinations of metals may be advantageously used, dependent to some extent upon the work which is to be performed by the finished product, I have secured excellent results in various types of bearings fabricated largely of powdered copper and tin. In such a structure, I prefer to use a small proportion of graphite as well as a small proportion of other lubricant, the latter constituent serving not only to assist in bonding the materials together prior to sintering, but also to assist in flowing the constituents into the mold. I have used powdered copper in proportions of from 75 to 95%, powdered tin in proportions of from 5 to 20%, graphite up to 2% and lubricant from .2 to 5%, all by weight. The constituents may be thoroughly mixed together, poured into a mold and compressed to form a briquette of the desired shape. The pressure to which the mixture is subjected may be varied to suit conditions. One desirable pressure I have found is approximately 30,000 pounds per square inch. The pressure, however, may vary from 10,000 pounds per square inch to 75,000 pounds per square inch.

After the briquette has been thus formed, it may be sintered in a reducing bath. One very desirable bath is a molten cyanide bath. The heat to which the briquette is subjected may be varied in accordance with the metals used, it being advantageous to have the heat slightly below the melting point of the metal which forms the largest proportion of the mixture. When copper is the main constituent, the heat may be approximately 1500° Fahrenheit. If the metal used has a higher or lower melting point than copper, the heat may be varied accordingly.

The lubricant used in the mix may be ordinary lubricating oil which will volatilize appreciably below the sintering temperature with a resultant production of voids in the sintered bearing.

It will be readily apparent that the briquette to be formed may take any desired form or shape. For instance, a perfectly round bushing or bearing structure may be formed or the structure may be formed in sections and assembled, as in the case of main or connecting rod bearings for internal combustion engines.

The bearings so formed will be highly porous in structure and will oftentimes be capable of absorbing up to 60% of their volume in oil. The bearing so formed and impregnated with oil may be used in many instances without continuously supplying lubricant thereto, inasmuch as the bearing is inherently self-lubricating.

The reducing bath to which the bearing is subjected not only prevents oxidation of the minute particles which compose the bearing, but also reduces any oxides that may be contained in the briquette and the particles are coalesced, producing a much stronger structure than those which have oxides between metallic particles.

After sintering of the bearing and before impregnating the same with oil, it is desirable that the bearing be submerged in boiling water or the like for a period of 20 to 30 minutes, after which it is rinsed in additional boiling water to remove as nearly as possible all of the cyanide remaining in the structure. After the bearing has been allowed to dry, it may be impregnated with lubricant.

A bearing produced as herein described will possess the characteristics of being strong and hard, as well as porous, and will, therefore, withstand much harder usage than will a bearing formed from similar metals which have not been sintered in a reducing bath.

It will be obvious that various changes may be made in the materials used, the proportions thereof, in the bath to which the bearing is subjected, as well as in many other details. I have herein described one form of my invention and method of making the same, but do not wish to be limited to the specific form or method described. It is my intention to cover by my claims such changes as may be reasonably included within the scope of my invention.

What I claim is:

1. The method of forming a porous metal bearing which comprises compressing powdered metal into a briquette, and immersing said briquette in a molten cyanide bath.

2. The method of forming a porous metal bearing which comprises compressing powdered copper, powdered tin, graphite, and a volatilizable lubricant into a briquette, and immersing said briquette in a molten cyanide bath, said lubricant having a volatilizing temperature lower than the fusion temperature of the cyanide bath.

3. The method of forming a porous metal bearing which comprises compressing powdered metal and a volatilizable substance into a briquette, and immersing said briquette in a molten cyanide bath.

CHARLES F. SHERWOOD.